US008859952B2

(12) United States Patent
Ito et al.

(10) Patent No.: US 8,859,952 B2
(45) Date of Patent: Oct. 14, 2014

(54) RECORDING MEDIUM AND INFRARED READING METHOD

(75) Inventors: Yuka Ito, Kanagawa (JP); Shinji Hasegawa, Kanagawa (JP); Minquan Tian, Kanagawa (JP); Suguru Nakaso, Kanagawa (JP); Makoto Furuki, Kanagawa (JP)

(73) Assignee: Fuji Xerox Xo., Ltd., Tokyo (JP)

( * ) Notice: Subject to any disclaimer, the term of this patent is extended or adjusted under 35 U.S.C. 154(b) by 317 days.

(21) Appl. No.: 13/216,809

(22) Filed: Aug. 24, 2011

(65) Prior Publication Data

US 2012/0199731 A1 Aug. 9, 2012

(30) Foreign Application Priority Data

Feb. 8, 2011 (JP) ................................ 2011-025305

(51) Int. Cl.

*G06K 7/10* (2006.01)
*G03G 9/09* (2006.01)
*G03G 9/087* (2006.01)
*G03G 15/00* (2006.01)
*G03G 9/08* (2006.01)

(52) U.S. Cl.

CPC .......... *G03G 9/08755* (2013.01); *G03G 9/0924* (2013.01); *G03G 2215/00067* (2013.01); *G03G 9/0926* (2013.01); *G03G 15/5062* (2013.01); *G03G 2215/00755* (2013.01); *G03G 9/0906* (2013.01); *G03G 9/0821* (2013.01)

USPC ........................................................ 250/271

(58) Field of Classification Search

CPC ........... G03G 15/5062; G03G 9/0926; G03G 9/08755; G03G 9/0906; G03G 9/0924; G03G 9/0821; G03G 2215/00067; G03G 2215/0075

USPC ........................................................ 250/271

See application file for complete search history.

(56) References Cited

U.S. PATENT DOCUMENTS

| | | | | | |
|---|---|---|---|---|---|
| 5,344,732 | A | | 9/1994 | Chiba et al. | |
| 6,153,879 | A | * | 11/2000 | Yoshinaga et al. | 250/271 |
| 7,457,476 | B2 | | 11/2008 | Olsson | |
| 2002/0004131 | A1 | * | 1/2002 | Darsillo et al. | 428/328 |
| 2003/0189664 | A1 | | 10/2003 | Olsson | |
| 2006/0256369 | A1 | * | 11/2006 | Mitamura | 358/1.15 |
| 2006/0279751 | A1 | * | 12/2006 | Onishi | 358/1.8 |
| 2007/0035758 | A1 | * | 2/2007 | Hasuike | 358/1.13 |
| 2007/0090177 | A1 | * | 4/2007 | Mitamura | 235/375 |
| 2008/0025754 | A1 | * | 1/2008 | Ishiyama et al. | 399/106 |
| 2009/0003733 | A1 | * | 1/2009 | Osakabe et al. | 382/314 |
| 2010/0203437 | A1 | * | 8/2010 | Yanagida | 430/105 |

FOREIGN PATENT DOCUMENTS

| | | |
|---|---|---|
| JP | A-03-271771 | 12/1991 |
| JP | A-04-083274 | 3/1992 |
| JP | A-2005-505061 | 2/2005 |

* cited by examiner

*Primary Examiner* — Constantine Hannaher
*Assistant Examiner* — Gisselle Gutierrez
(74) *Attorney, Agent, or Firm* — Oliff PLC

(57) ABSTRACT

A recording medium includes a surface in which an infrared absorptance is less than a threshold value; and plural dot images that records information by an arrangement pattern formed on the surface, in which the infrared absorptance is equal to or more than the threshold value, and a specular gloss to infrared rays is equal to or less than 22%.

14 Claims, 5 Drawing Sheets

RECORDING MEDIUM AND INFRARED READING METHOD

CROSS-REFERENCE TO RELATED APPLICATIONS

This application is based on and claims priority under 35 USC 119 from Japanese Patent Application No. 2011-025305 filed Feb. 8, 2011.

BACKGROUND (i) Technical Field

The present invention relates to a recording medium and an infrared reading method.

(ii) Related Art

A recording medium which records information by an arrangement of plural marks which are formed with an infrared absorbing toner that absorbs infrared rays is known. Examples of the information recorded on the recording medium include identification information for identifying a recording sheet and position information that represents coordinate positions on a recording sheet. As an example of a device that reads the identification information or the position information from the recording medium, a pen-shaped hand-held reading device which includes an LED (Light Emitting Diode) that emits infrared rays and a CCD (Charge Coupled Device) image sensor that detects infrared rays is known.

However, when marks formed on the recording medium using the pen-shaped device described above are read, the reading angle generally changes with respect to the surface that is to be scanned. Thus, when the reading direction of the device is identical to or approaches the direction where the intensity of light reflected from the surface of the recording medium increases, the intensity of the infrared ray reflected from a mark and received by the device is equal to or more than a threshold value determined for the device. As a result, the mark is erroneously recognized as not being present.

SUMMARY

According to an aspect of the present invention, there is provided a recording medium including: a surface in which an infrared absorptance is less than a threshold value; and plural dot images that records information by an arrangement pattern formed on the surface, in which the infrared absorptance is equal to or more than the threshold value, and a specular gloss to infrared rays is equal to or less than 22%.

BRIEF DESCRIPTION OF THE DRAWINGS

Exemplary embodiments of the present invention will be described in detail based on the following figures, wherein.

DETAILED DESCRIPTION

1. Exemplary Embodiments

Hereinafter, exemplary embodiments of the present invention will be explained. Some terms used in the description of the present invention are defined as follows.

A "light" is electromagnetic wave including at least infrared rays in addition to visible light rays.

A "dot image" has an image which has an outline surrounded by the surface of a recording medium and which is formed by filling a region closed by the outline with an image forming material. In the exemplary embodiments, the dot image has a circular outline.

"Specular gloss" is a specular gloss with an incidence angle and a reflection angle of 75°, measured according to "Test Method for 75' Specular Gloss of Paper and Paperboard" defined by the JIS (Japanese Industrial Standard) P 8142. In the JIS P 8142, the gloss level of the surface of a glass having a refractive index of 1.567 over the entire wavelength range of visible light is defined as 100%, and the gloss level of a sample is determined based on the glass surface defined in this way. In the present invention, the gloss level of the surface of a glass having a refractive index of 1.567 in a predetermined wavelength range of infrared rays instead of over the entire range of visible light is defined as 100%, and the specular gloss is determined based on the gloss level of the glass surface.

1-1. Overall Configuration of Image Forming Apparatus

Figure 1:
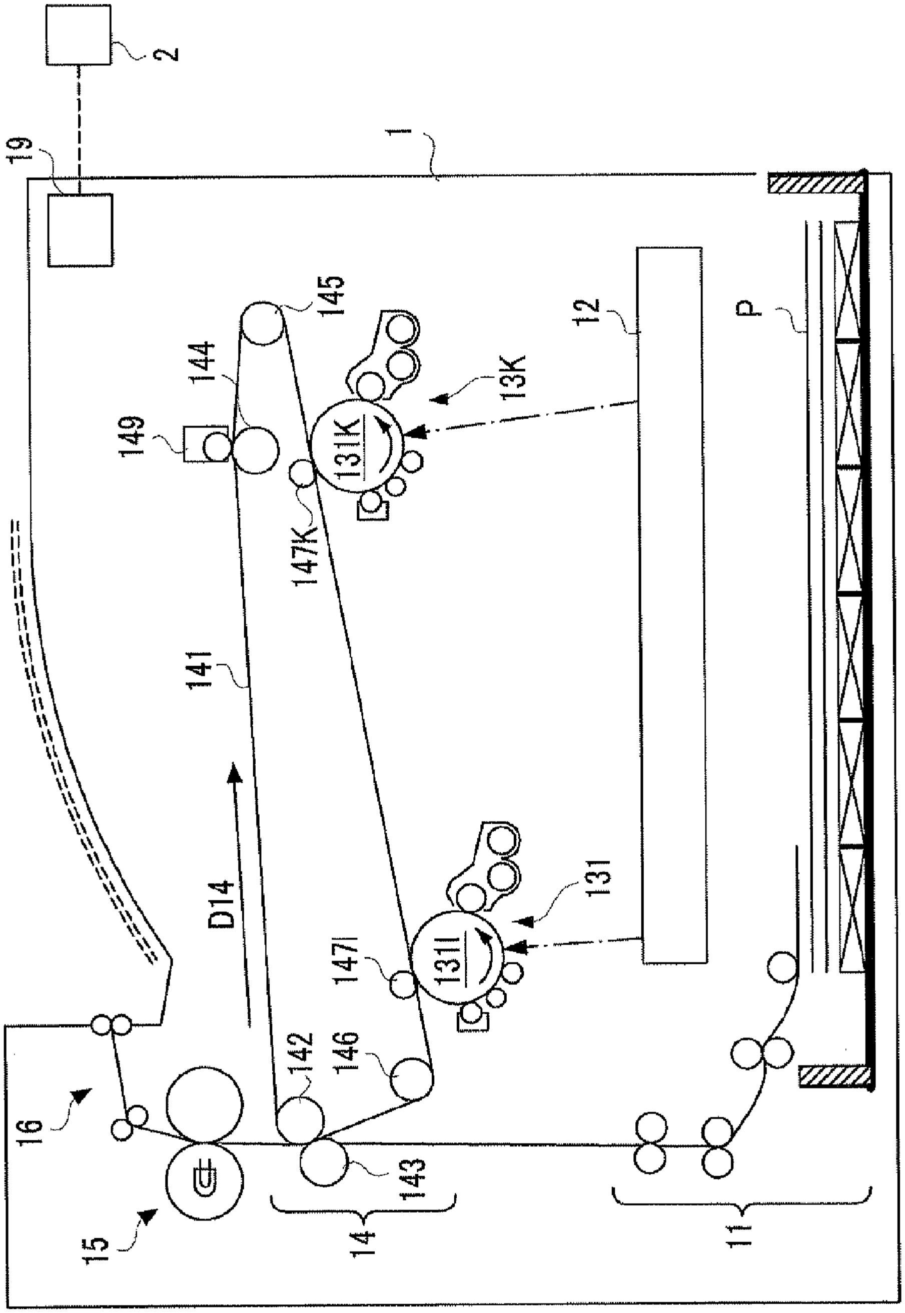
FIG. 1 shows an overall configuration of an image forming apparatus according to an exemplary embodiment.

FIG. 1 shows an overall configuration of an image forming apparatus 1 according to the present exemplary embodiment. As shown in the figure, the image forming apparatus 1 includes a supply unit 11, an optical scanning unit 12, developing units 13I and 13K, a transfer unit 14, a fixing unit 15, a discharge unit 16, and a control unit 19. The supply unit 11, the optical scanning unit 12, the developing units 13I and 13K, the transfer unit 14, the fixing unit 15, and the discharge unit 16 are controlled by the control unit 19. The letter "I" at the end of the reference numeral means that one denoted by this letter is a configuration corresponding to an infrared absorbing toner that absorbs infrared rays and the letter "K" means that one denoted by this letter is a configuration corresponding to a black toner.

Here, the infrared absorbing toner is an example of an invisible coloring material. The infrared absorbing toner is a toner that exhibits little color formation property resulting from absorption of light in a specific wavelength of the visible light region (400 nm or more and less than 700 nm). For example, the maximum absorptance in the visible light region is less than 7%, and absorptance in an infrared region (750 nm or more and less than 1000 nm) is equal to or more than 30% which is an example of a predetermined threshold value. The threshold value is determined depending on the readability of an image formed with the infrared absorbing toner by a reading device. Here, the term "invisible" means a state where it is difficult to recognize the coloring material with just a glance and a state where it is hard to recognize the coloring material with the naked eye as well as a state where the coloring material is completely not recognizable with the naked eye.

The black toner is an example of a visible coloring material. The black toner is a toner having a wide absorption range and having an absorptance of 30% or more in the visible light region. An image formed with the black toner is recognized as black by the human eye.

The developing units 13I and 13K have substantially the same configuration except that they use different toners. In the following explanation, the infrared absorbing toner and the black toner will be simply referred to as a toner if it is not necessary to distinguish between them. Moreover, the developing units 13I and 13K will be referred to as a "developing unit 13", if it is not necessary to distinguish between them, by deleting the letters representing the kind of toner at the end of the reference numerals. Details of the respective toners will be described later. When the toner combines with a carrier, charges are transferred from the carrier to the toner. The combined toner and carrier are supplied to the developing unit 13 as a developer.

The supply unit 1 stores sheets P used as a recording medium, which are cut into a predetermined size. The sheets P stored in the supply unit 11 are taken out one by one in accordance with an instruction of the control unit 19 and transported to the transfer unit 14 through a sheet transport path.

Here, the sheet P is a so-called plain paper formed from pulp fibers. The recording medium is not limited to paper but may be sheets formed of a resin, for example. However, in these radiological images, the infrared absorptance on the surface of the recording medium is less than 30% which is an example of the above-mentioned threshold value, and is preferably less than 7%.

The control unit 19 stores individual image data for each toner in a RAM (Random Access Memory) or the like in a correlated manner. The optical scanning unit 12 includes an illumination device that generates light beams corresponding to the respective image data to illuminate the developing units 13I and 13K with the light beams under the control of the control unit 19.

The image data correlated with the infrared absorbing toner used by the developing unit 13I represent an arrangement pattern in which dot images which are images having a dot shape are arranged in a grid form on the surface of the sheet P. The arrangement pattern represents information such as identification information by the portions formed within a range of regions read by an infrared reading device. Details of the dot images and the arrangement thereof will be described later.

The transfer unit 14 is a transfer device which includes an intermediate transfer belt 141, a belt transport roll 142, a secondary transfer roll 143, a cleaner backup roll 144, a steering roll 145, a tension roll 146, primary transfer rolls 147I and 147K, and a belt cleaner 149, and which transfers an image formed by the developing unit 13 to the sheet P. Here, the primary transfer rolls 147I and 147K will be collectively referred to as a primary transfer roll 147 if it is not necessary to distinguish between them. The intermediate transfer belt 141 is an endless strip member that performs revolving movement, and is stretched by the belt transfer roll 142, the cleaner backup roll 144, the steering roll 145, the tension roll 146, and the primary transfer roll 147.

The belt transfer roll 142 is connected to a driving unit (not shown) such as a motor through a gear wheel or the like so as to cause the intermediate transfer belt 141 to perform revolving movement in a direction indicated by the arrow D14 in the figure. The other rolls which are not connected to the driving unit are rotated by the revolving movement of the intermediate transfer belt 141. When the intermediate transfer belt 141 performs revolving movement in the direction indicated by the arrow D14 in the figure, the image transferred by the transfer unit 14 is moved to a region that makes contact with the belt transport roll 142 and the secondary transfer roll 143. The secondary transfer roll 143 is disposed at the outer side of the intermediate transfer belt 141 at a position facing the belt transport roll 142 and interposes the intermediate transfer belt 141 between the secondary transfer roll 143 and the belt transport roll 142. The secondary transfer roll 143 is maintained at a predetermined potential by being grounded, for example.

The belt transport roll 142 presses a portion being in contact with the intermediate transfer belt 141 from the inner side toward the outer side and charges the contact portion with the same polarity as the toner. In this way, a predetermined potential difference is created between the contact portion of the intermediate transfer belt 141 and the secondary transfer roll 143, whereby the image on the intermediate transfer belt 141 is transferred to the sheet P transported from the supply unit 11 by the potential difference.

The belt cleaner 149 removes a non-transferred toner remaining on the surface of the intermediate transfer belt 141. The cleaner backup roll 144 supports the intermediate transfer belt 141 from the inner side at a position facing the belt cleaner 149 so as to back up the cleaning of toner by the belt cleaner 149.

The tension roll 146 support a portion of the intermediate transfer belt 141 from the inner side, extending from the primary transfer roll 147I to the belt transport roll 142. Moreover, the transfer unit 14 transfers the sheet P in which the image is transferred to the fixing unit 15.

Each developing unit 13 includes a photoconductor drum 131 used as an example of an image carrier that carries an image. Each photoconductor drum 131 carries a latent image corresponding to light emitted from the optical scanning unit 12. Each developing unit 13 forms an image represented by the image data correlated with each toner based on the latent image carried by the photoconductor drum 131 using the corresponding toner. Specifically, the developing unit 13 forms an image by allowing the photoconductor drum 131 to carry charges on the surface thereof, having the same polarity as the toner and causing the optical scanning unit 12 to irradiate the surface with light so that the toner adheres to a portion where charges are lost.

Moreover, as described above, the primary transfer roll 147 is disposed at the inner side of the intermediate transfer belt 141 at a position facing the photoconductor drum 131. The primary transfer roll 147 presses a portion being in contact with the intermediate transfer belt 141 from the inner side toward the outer side and charges the contact portion with a polarity reverse to that of the toner. In this way, a potential difference is created between the contact portion of the intermediate transfer belt 141 and a portion of the photoconductor drum 131 facing the primary transfer roll 147, whereby an image is transferred to the intermediate transfer belt 141.

After the image is transferred, the charges on the surface of the photoconductor drum 131 are erased by a cleaner, and the remaining non-transferred toner is removed.

The fixing unit 15 includes a heating roll and a pressure roll and causes the image transferred to the sheet P to be fixed to the sheet P by heating and pressure using these rolls. The discharge unit 16 discharges the sheet P having passed through the fixing treatment by the fixing unit 15 to a sheet tray that is provided on the upper portion of the image forming apparatus 1. The control unit 19 forms an image on the sheet P by controlling the respective configurations of the image forming apparatus 1 such as the developing unit 13 or the like in accordance with an instruction signal from an external device 2 that is communicably connected thereto or an operation of a user from an operation unit (not shown).

1-2. Dot Image

Figure 2:
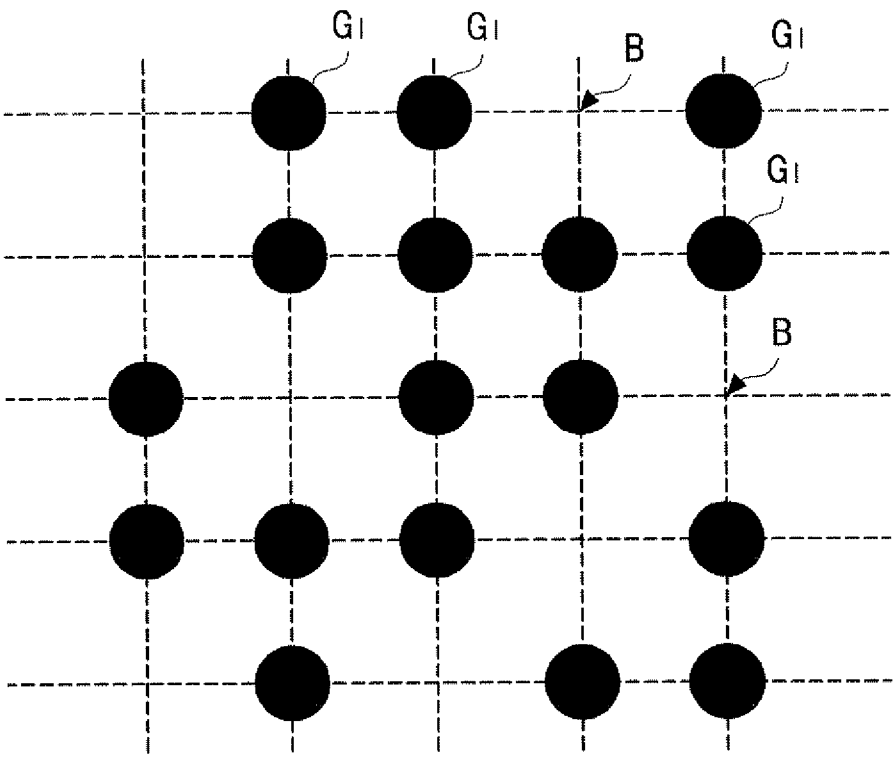
FIG. 2 shows an example of dot images.

FIG. 2 shows an example of dot images. As shown in the figure, dot images which are images having a dot shape are arranged in a grid form on the sheet P, and an image representing information corresponding to the arrangement pattern is formed with an infrared absorbing toner. In the following explanation, as shown in the figure, a dot image formed with an infrared absorbing toner will be referred to as a dot image $G_I$, and a region where no infrared absorbing toner is disposed will be referred to as a blank region B. As above, the plural dot images $G_I$ disposed on the sheet P are an example of plural dot images which is formed on the surface of a recording medium so as to record information by an arrangement pattern formed in a range of regions read by an infrared reading device, in which an infrared absorptance is equal to or more than a threshold value, and the specular gloss to infrared rays is equal to or less than 22%.

1-3. Developer 1-3-1. Carrier

The developer is a so-called two-component developer including a toner and a carrier. A carrier that can be used as the two-component developer is not particularly limited, and the known carriers may be used. Examples thereof include a magnetic metal such as iron, nickel, or cobalt; a magnetic oxide such as ferrite or magnetite; a resin coated carrier having a resin coated layer on the surface of these core materials; and a magnetic dispersion carrier. A resin coated carrier in which a conductive material or the like is dispersed in a matrix resin may also be used.

1-3-2. Toner

The toner includes a pigment and a resin and is produced by dispersing a pigment in a resin. The pigment absorbs light in a predetermined wavelength region to decrease the intensity of light in the wavelength region included in reflection light. The resin disperses and carries the pigment and becomes a factor that determines the gloss level of a coated surface.

(1) Pigment

The pigment included in the infrared absorbing toner includes an infrared absorbent that absorbs infrared rays in the wavelength region of 750 nm and more and 1000 nm or less, for example, as the light in the predetermined wavelength region. The pigment contains a perimidine-based squarylium dye represented by Formula (I) below, for example, as the infrared absorbent.

Formula 1

(I)

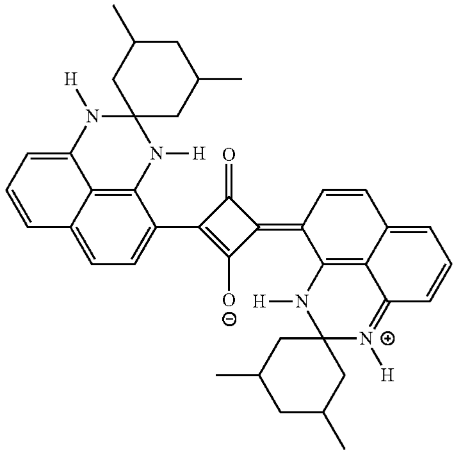

The pigment included in the black toner has a wide absorption range in the visible wavelength region. Examples of the pigment included in the black toner include inorganic pigments such as carbon black, copper oxide, manganese dioxide, activated carbon, or ferrite, and organic pigments such as aniline black. The pigment included in the black toner may be any pigment that forms a black color. However, a pigment having a high absorptance in the infrared region may affect the reading of dot images formed with the infrared absorbing toner. Thus, the absorptance of the pigment in the infrared region is preferably relatively as low as less than 7%, for example.

(2) Resin

The resin included in the infrared absorbing toner includes at least a thermoplastic binder resin. Examples of the binder resin include the known resins used as a general toner such as a polyester resin, a polystyrene resin, a polyacrylic resin, a vinyl-series resin, a polycarbonate resin, a polyamide resin, a polyimide resin, an epoxy resin, or a polyurea resin, and copolymers thereof. Among these resins, a polyester resin is preferred since it satisfies various toner properties such as adhesion with a sheet, a low-temperature fixing property, a fixing strength, and storability. The binder resin preferably has a weight average molecular weight of 5000 or more and less than 40000 and preferably has a glass transition temperature of 55° C. or more and less than 75° C.

Moreover, the resin may include inorganic fine particles for the purpose of adjusting viscoelasticity. The inorganic fine particles may be those used as external additives to treat the surface of the toner. Specifically, examples of the inorganic fine particles include silica, alumina, titanium oxide, barium titanate, magnesium titanate, calcium titanate, strontium titanate, zinc oxide, silica sand, clay, mica, limestone silica, diatomaceous earth, cerium chloride, red iron oxide, chromium oxide, cerium oxide, antimony trioxide, magnesium oxide, zirconium oxide, silicon carbide, and silicon nitride. These inorganic particles are generally used to improve flowability of the resin (namely, decrease the viscoelasticity). This is because if the viscoelasticity decreases, the surface of an image formed with the toner becomes smoother, and thus, the gloss level increases.

Moreover, the resin may include a metal element having two valences or more. The metal element having two valences or more is used to decrease the flowability of the resin (namely, increase the viscoelasticity). Although the reason why the viscoelasticity of a resin increases when the resin includes a metal element having two valences or more is not clear, the following is supposed to be attributable to this.

That is, since a metal element having two valences or more is present in a state where it is dispersed in a crystalline resin and a release agent within a toner base particle to form ionic crosslinks, the metal element increases the elasticity of the toner base particle and improves compatibility between the crystalline resin and the release agent. Thus, the metal element prevents a remarkable decrease in the viscosity of the crystalline resin during fixing and suppresses phase separation between the crystalline resin and the release agent. Accordingly, it is thought that the gloss of an image formed with a toner including a resin in which the metal element is dispersed decreases. This is because when the viscoelasticity increases, the surface of the image formed with the toner loses smoothness, and thus, the gloss level decreases.

The amounts of the inorganic fine particles and the metal element having two valences or more added to prepare the infrared absorbing toner are determined so that the specular gloss of an image formed with the infrared absorbing toner, measured for infrared rays in the above-mentioned region is at least 22% or less, and preferably, is less than 15%.

The gloss level of an image formed with an infrared absorbing toner of the related art is relatively high. For example, when an image having a TMA (Toner Mass Area) of 2 mg/cm$^2$ or more and less than 4 mg/cm$^2$ is formed, the specular gloss of the image is not less than 25%.

The resin included in the black toner may be the known resin used for the general toner and may be the same resin included in the infrared absorbing toner.

2. Examples

As an example of a recording medium according to the exemplary embodiment of the present invention, a sheet P (hereinafter referred to as a "first sheet P") is prepared by forming dot images with the infrared absorbing toner described above on the surface of a full-color copier sheet, available from Fuji Xerox Co., Ltd., which is an example of a so-called plain paper. Moreover, as a comparative example, a sheet P (hereinafter referred to as a "second sheet P") is prepared by forming dot images with a toner for comparison (hereinafter referred to as a comparative toner) on the surface of the full-color copier sheet. The comparative toner is made up of a pigment having the same absorption range as the infrared absorbing toner described above and the known resin used for the general toner so that the specular gloss measured for an image formed with a toner including the pigment and the resin is 25% or more. These sheets are evaluated. The infrared absorptance of a sheet P in which no image is formed with these toners is less than 30% which is an example of the above-mentioned threshold value.

Figure 3:
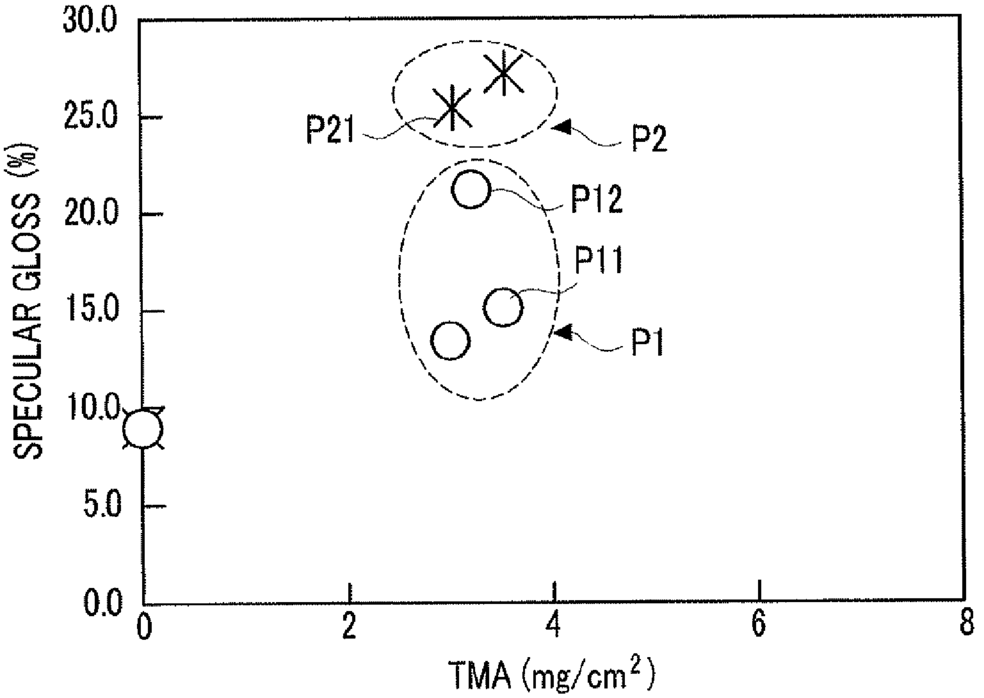
FIG. 3 shows the relationship between a toner density and a specular gloss in dot images.

FIG. 3 shows the relationship between a toner density and a specular gloss of dot images $G_I$ which are formed on the first and second sheets P1 and P2. In the second sheet P2, when the toner density (TMA) is 3 mg/cm$^2$ or more and less than 4 mg/cm$^2$, the specular gloss of the dot images $G_I$ formed with the comparative toner is 25% or more. Here, a sheet having the lower specular gloss among the two examples of the second sheet P2 shown in FIG. 3 is denoted by P21.

On the other hand, in the first sheet P1, when the toner density (TMA) is 3 mg/cm$^2$ or more and less than 4 mg/cm$^2$, the specular gloss of the dot images $G_I$ formed with the infrared absorbing toner is at least 22% or less, and preferably is less than 15%. As shown in the figure, in this case, the specular gloss of dot images $G_I$ formed on the first sheet P1 is 12% or more and 22% or less. Here, a sheet having the highest specular gloss among the three examples of the first sheets P1 shown in FIG. 3 is denoted by P12, and a sheet having the next highest specular gloss to the sheet P12 is denoted by P11. Moreover, when the toner density is 0 mg/cm$^2$, namely no image is formed with a toner, the specular gloss of the sheet P itself is 9% or more and less than 10%.

Figure 4A:
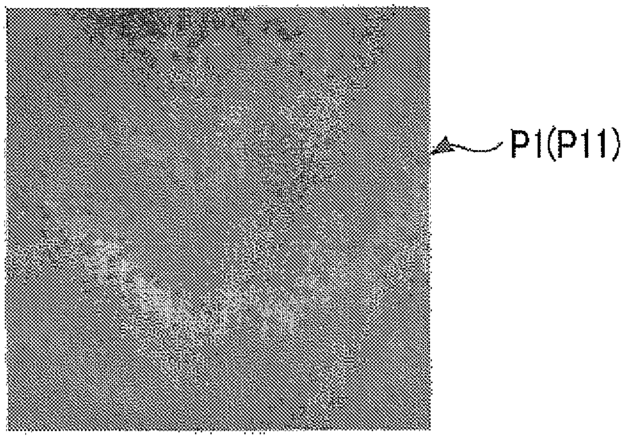
FIGS. 4A to 4C show examples of images obtained by reading first and second sheets.
Figure 4B:
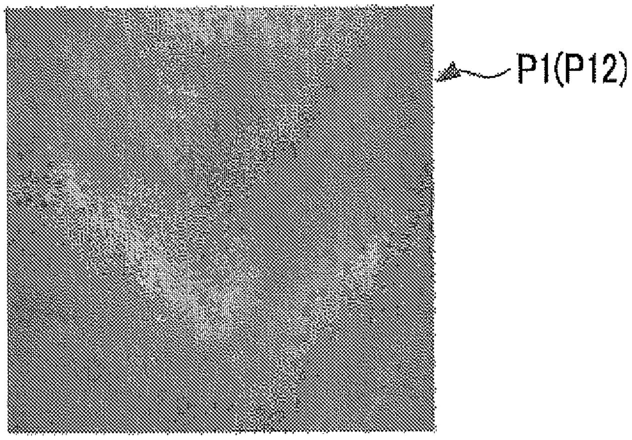
Figure 4C:
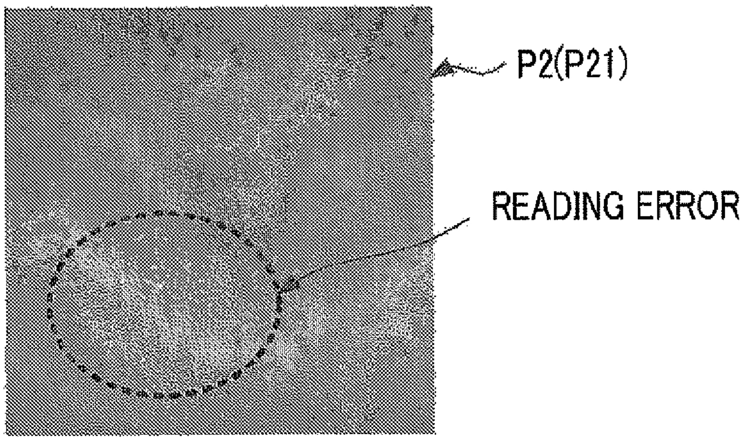

FIGS. 4A to 4C show examples of images obtained when the first and second sheets P1 and P2 are read by a reading device. The reading device includes an illumination unit such as a LED that emits infrared rays, an imaging element such as a CCD that detects infrared rays, a visible-light cut-off filter that cuts off visible light rays. In the reading device, the illumination unit irradiates an image formed on a sheet with infrared rays, the visible-light cut-off filter removes visible light rays from reflection light including infrared rays reflected from the image, and the imaging element detects light having passed through the visible-light cut-off filter. In this example, the imaging element includes 50176 photodiodes in total (224 by 224), and these respective photodiodes generate charges corresponding to the intensity of the received infrared rays, whereby an image made up of 224 by 224 pixels is formed based on the generated charges. Specifically, a global shutter-type infrared CMOS (Complementary Metal Oxide Semiconductor) sensor in which the spectral sensitivity to 850 nm is 60% or more of the spectral sensitivity to 550 nm is used as the imaging element. Moreover, a SFH 4350 (infrared LED) (available from OSRAM GmbH) designed with the central wavelength of 850 nm is used as an illuminator, and a TECHNALIGHT IR/R2805 (available from Sumitomo Bakelite Co. Ltd.) is used as the visible-light cut-off filter.

FIG. 4A shows an image obtained by reading, at a reading angle of 10°, the sheet P11 (an example of the first sheet P1) on which dot images having the specular gloss of 13.7% are formed. FIG. 4B shows an image obtained by reading, at a reading angle of 10°, the sheet P12 (an example of the first sheet P1) on which dot images having the specular gloss of 22.0% are formed. FIG. 4C shows an image obtained by reading, at a reading angle of 10°, the sheet P21 (an example of the second sheet P2) on which dot images having the specular gloss of 25.2% are formed.

In the image shown in FIG. 4A, there is substantially no influence of specular reflection on the surface of the sheet 211, and there is no recognition error wherein dot images which are present are erroneously recognized as not being present. Moreover, in the image shown in FIG. 4B, although there is a small influence of specular reflection on the surface of the sheet P12 as compared to the sheet P11, there is no recognition error described above.

On the other hand, in the image shown in FIG. 4C, it can be understood that specular reflection light is received from several dot images in a region of the surface of the second sheet 92 as indicated by a broken line. Moreover, as a result, the reading device makes a recognition error such that it does not recognize a portion where dot images are present.

Figure 5:
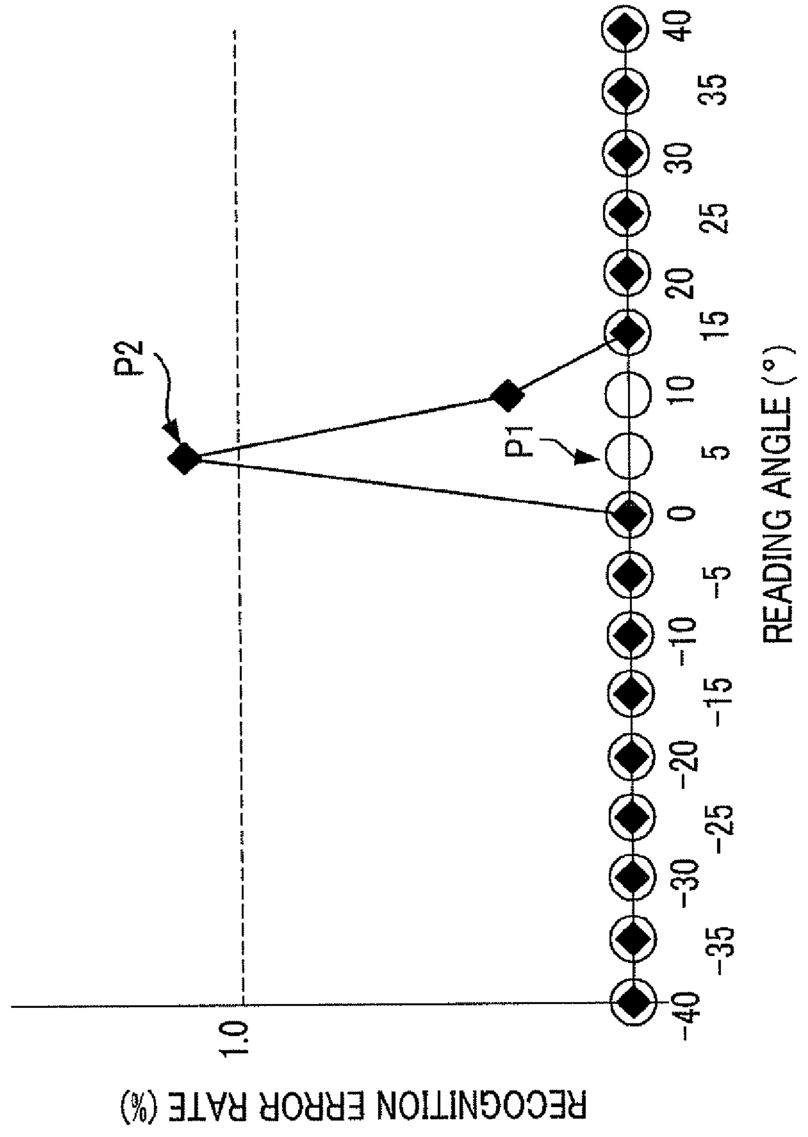
FIG. 5 shows an example of measurements of a recognition error rate at each reading angle.

FIG. 5 shows an example of measurements of a recognition error rate of the first sheet 21 (the sheets P11 and P12) and the second sheet P2 (the sheet P21) at each reading angle. The horizontal axis represents the angle in the reading direction when the reading device reads an image, and the angle is represented by an angle with respect to a direction normal to the surface of the sheet. For example, when the sheet is read along a direction normal to the surface of the sheet, the reading angle is 0°. The vertical axis represents a recognition error rate and represents the rate that formed dot images are erroneously recognized as not being present. The recognition error rate is obtained after performing recognition 500 times at each reading angle and is represented by a percentage obtained by dividing the number of recognition errors by 500. As shown in the figure, when the recognition error rate is measured for the second sheet P2 while changing the reading angle by 5° from −40° to 40°, it is found that the recognition error rate is about 0.3% when the reading angle is 10°, and the recognition error rate exceeded 1.0% when the reading angle is 5°. On the other hand, when the recognition error rate is measured for the first sheet 21, the recognition error rate is 0% at any reading angle.

As described above, when information is recorded by forming plural dot images on a sheet with an infrared absorbing toner (image forming material) which is prepared so that the specular gloss of a formed image is at least 22% or less, and preferably is less than 15%, the probability of the recognition errors is decreased as compared to when the toner of the related art in which the specular gloss of a formed image is 25% or more is used.

3. Modified Examples

While exemplary embodiments have been described, the contents of the exemplary embodiments may be modified in a manner described below. Moreover, the modified examples below may be combined with each other.

3-1. Modified Example 1

In the exemplary embodiments described above, although the pigment contains perimidine-based squarylium dye represented by Formula (I), for example, as the infrared absorbent, the pigment may contain other infrared absorbents.

Moreover, in the above exemplary embodiments, although the pigment includes the infrared absorbent that absorbs infrared rays as light in the predetermined wavelength region, the pigment may include an absorbent that absorbs light in a wavelength region other than the infrared region. That is, the pigment may be one which absorbs infrared rays and may be one which does not absorb infrared rays but absorbs light in a wavelength region other than the infrared region. In any case, the pigment may be one which absorbs light in a predetermined wavelength region.

3-2. Modified Example 2

In the exemplary embodiments above, although the image forming apparatus 1 has the developing units 13K and 13I which are respectively disposed on the upstream and downstream sides in the revolving direction of the intermediate transfer belt 141, the arrangement of these developing units 13 may be reversed.

Moreover, the developing unit 13K may be not provided as long as the developing unit 13I is present. Moreover, instead of, or in addition to, the developing unit 13K, another developing unit 13 that forms an image with other toner including a pigment different from a black pigment may be provided on the revolving path of the intermediate transfer belt 141. For example, when developing units that include pigments having an absorption range corresponding to visible light rays (for example, light having wavelengths of 400 nm or more and less than 700 nm), such as, for example, cyan, magenta, and yellow pigments are provided in addition to the developing units 13I and 13K, a visible image visually perceived by a person as well as an invisible image detected by an infrared light sensor are formed on a recording medium

3-3. Modified Example 3

In the exemplary embodiments above, although the dot images are circular, the dot images may be rectangular.

Moreover, in the exemplary embodiments above, although the dot images are disposed in a grid form so as to be located on the intersections of the imaginary vertical and horizontal lines of the grid, the dot images may be disposed at positions shifted from the intersections. Moreover, the amount and direction of the shift may be determined for each dot image so that information is recorded by a combination of the amount and direction of the shifts of the respective dot images from the corresponding intersections.

Although various values may be used as the spacing of the grid, for example, when the recording medium is an A4-size sheet (210 mm by 297 mm) specified in ISO 216, the grid spacing may be set to 0.01 mm or more and less than 1.0 mm, or more preferably be set to about 0.3 mm (0.25 mm or more and less than 0.35 mm). This is preferable because the number of arrangement patterns of the dot images is sufficient for specifying the position on the recording medium.

3-4. Modified Example 4

In the exemplary embodiments above, although a predetermined amount of inorganic fine particles or a metal element having two valences or more is added to a resin which is the raw toner material so that the specular gloss of the infrared absorbing toner is 22% or less, other materials may be added. In any case, the infrared absorbing toner may include any material as long as the specular gloss of an image formed with the infrared absorbing toner is 22% or less.

Toner of Example According to the Exemplary Embodiments

Synthesis of Crystalline Polyester Resin (1)

After an acid component containing 5% by mol of dimethyl fumarate, 91% by mol of dimethyl sebacate, and 4% by mol of sodium isophthalic acid dimethyl-5-sulfonate, ethylene glycol (3.5 times the mol of the acid component) and Ti (OBu) 4 (0.012% by mass based on the total mass of the acid component) as a catalyst are put into a heat-dried two-necked flask, air inside the flask is evacuated by a pressure reduction operation, an inside of the flask is brought into an inert atmosphere using a nitrogen gas and, then, the mixture in the flask is subjected to reflux at 180° C. for 5 hours under mechanical stirring. Then, after an excess quantity of ethylene glycol is removed from the mixture by distillation under reduced pressure, the temperature of the resultant mixture is gradually increased up to 230° C. and the resultant mixture is stirred at this temperature for 2 hours to allow it to be in a viscous state and, thereafter, air-cooled to terminate the reaction; as a result, a copolymerized polyester is obtained at a yield rate of 89%. The thus-obtained copolymerized polyester is dissolved in THF (tetrahydrofuran), and then, precipitated again for purification using methanol to obtain the crystalline polyester resin (1) at a yield rate of 84%.

When the thus-obtained crystalline polyester resin (1) is subjected to a molecular weight measurement (as a value converted to polystyrene) by gel permeation chromatography, a mass average molecular weight (MW) thereof is 10,200 and a number average molecular weight (Mn) thereof is 4,500.

Furthermore, when a melting point (Tm) of the crystalline polyester resin (1) is measured by the measurement method described above by using a differential scanning calorimeter (DSC), it shows a distinct peak and the temperature of the crest (also referred to peak-top) thereof is 69° C. Furthermore, an ester concentration M thereof is calculated as being 0.096.

100 parts by mass of the thus-obtained crystalline polyester resin (1) and 1.5 part by mass of lauroyl peroxide are dissolved in 200 parts by mass of tetrahydrofuran to prepare a mixture and, then, 15 parts by mass of toluene dispersion liquid of 10% by mass of perimidine-based squarylium represented by Formula (I) is added to the thus-prepared mixture to prepare a dispersion liquid and 1.5 part by mass of titanic particles (volume average particle size: 20 nm), thereafter, tetrahydrofuran is removed from the thus-prepared dispersion liquid at 25° C. to prepare 103 parts by mass of a dispersion resin of the pigment and a polymerization initiator.

103 parts by mass of the above-prepared dispersion resin of the pigment and the polymerization initiator is added to 2000 parts by mass of water which has been heated to 80° C. within a flow of nitrogen and emulsified by applying a shear force by means of Ultraturrax at a rate of 8000 rpm for 20 minutes. Thereafter, the resultant emulsion liquid is cooled down to 25° C., added with 20 parts by mass of a release agent dispersion liquid (1) which has been prepared in a manner as described below and is dispersed at a rate of 3000 rpm for 5 minutes. Then, the pH of the resultant dispersion/mixture liquid of the resin and the release agent is adjusted to be 2.0 by using 2N nitric acid and the pH-adjusted dispersion/mixture liquid is added with 0.2 parts by mass of polyaluminum chloride and stirred at room temperature. The temperature of the resultant mixture is gradually increased while stirring and, when the temperature reached 50° C., the pH of this mixture is adjusted to be 7.0 and stirred at 75° C. for 2 hours to proceed an reaction. Thereafter, the thus-prepared reaction mixture is cooled down to room temperature, rinsed with a distilled water, and dried to obtain 90 parts by mass of toner (1).

The thus-obtained toner (1) is subjected to measurements by a Coulter counter TA-II type (aperture diameter: 50 μm, available from Coulter Inc.) to find that a volume average particle size thereof is 5.8 μm and a number average particle size thereof is 4.9 μm.

Toner of Comparative Example

Synthesis of Non-Crystalline Polyester Resin (A)

After 100 parts by mol of an acid component containing 80% by mol of terephthalic acid, 10% by mol of n-dodecenyl succinic acid and 10% by mol of trimellitic acid, 35 parts by mol of polyoxyethylene (2,0)-2,2-bis(4-hydroxyphenyl)propane, 65 parts by mol of polyoxypropylene(2,2)-2,2-bis(4-hydroxyphenyl)propane and 0.05% by mol of dibutyl tin oxide based on the total mol of the acid component are put in a heat dried flask, a nitrogen gas is introduced inside the flask to hold an inside thereof to be in an inert atmosphere and, then, a temperature of a mixture in the flask is increased and, thereafter, the resultant mixture is subjected to a copolycondensation reaction at a temperature of from 150° C. to 230° C. for about 12 hours; subsequently, pressure inside the flask is gradually reduced while maintaining the temperature in a range of from 210° C. to 250° C. to obtain a non-crystalline polyester resin (A) thus copolycondensed.

When the thus-obtained non-crystalline polyester resin (A) is subjected to a molecular weight measurement (as value converted to polystyrene) by gel permeation chromatography, the mass average molecular weight (MW) thereof is 14,600 and the number average molecular weight (Mn) thereof is 4,700.

96 parts by mass of the thus-obtained non-crystalline polyester resin (A), 16 parts by mass of perimidine-based squarylium represented by Formula (I) are melt-kneaded by a Banbury type kneader to obtain a densely colored resin composition. 20 parts by mass of the thus-obtained colored resin composition, 5 parts by mass of carnauba wax and 75 parts by mass of the non-crystalline polyester and 1.5 part by mass of titania particles (volume average particle size: 20 nm) are dispersed and dissolved in 100 parts by mass of ethyl acetate to prepare a dispersion solution. 200 parts by mass of the thus-obtained dispersion solution is added to a mixture liquid containing 1 part by mass of carboxymethyl cellulose, 20 parts by mass of calcium carbonate and 100 parts by mass of water and, then, dispersed by a high speed mixing operation by means of a mixer to obtain an emulsion liquid. The thus-obtained emulsion liquid is loaded in a beaker and, then, added with water of about 5 times the quantity thereof and, thereafter, held in a water bath at 45° C. for 10 hours while stirring to evaporate ethyl acetate contained therein. Subsequently, after calcium carbonate contained therein is dissolved by hydrochloride, the emulsion liquid is rinsed with water plural times to obtain a mixture of water and a toner. As a last step, water is evaporated at 45° C. by a vacuum dryer to obtain a toner (5).

The thus-obtained toner (5) is subjected to measurements by a Coulter counter TA-II type (aperture diameter: 50 μm, available from Coulter Inc.) to find that a volume average particle size thereof is 7.8 μm and a number average particle size thereof is 7.0 μm.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A recording medium comprising:

a surface in which an infrared absorptance is less than a threshold value; and a plurality of dot images that records information by an arrangement pattern formed on the surface, in which the infrared absorptance of the dot images is equal to or more than the threshold value, and a specular gloss to infrared rays of the dot images is equal to or less than 22%.

2. The recording medium according to claim 1, wherein the threshold value of the infrared absorptance is 30%.

3. The recording medium according to claim 1, wherein the threshold value of the infrared absorptance is 7%.

4. The recording medium according to claim 1, wherein the dot images are formed with an infrared absorbing toner.

5. The recording medium according to claim 4, wherein the infrared absorbing toner contains a perimidine-based squarylium dye.

6. The recording medium according to claim 4, wherein the infrared absorbing toner includes a resin containing a metal element having two valences or more.

7. The recording medium according to claim 1, wherein the plurality of dot images has a specular gloss of 15% or less.

8. The recording medium according to claim 4, wherein the infrared absorbing toner includes a resin containing inorganic fine particles.

9. The recording medium according to claim 1, wherein the dot images are spherical or rectangular.

10. An infrared reading method comprising:

forming a plurality of dot images on a recording medium having a surface in which an infrared absorptance is less than a threshold value, and in which the infrared absorptance of the dot images is equal to or more than the threshold value, and a specular gloss to infrared rays of the dot images is equal to or less than 22%;

irradiating the recording medium with infrared rays; and reading the dot images using a sensor that detects infrared rays reflected from the recording medium.

11. The infrared reading method according to claim 10, wherein the recording medium is a recording medium having a surface in which the infrared absorptance is less than 30%.

12. The infrared reading method according to claim 10, wherein the recording medium is a recording medium in which the infrared absorptance is less than 7%.

13. The infrared reading method according to claim 10, wherein the dot images are formed with an infrared absorbing toner.

14. The infrared reading method according to claim 13, wherein the infrared absorbing toner contains a perimidine-based squarylium dye.

* * * * *